US012570567B2

(12) United States Patent
Fotheringham et al.

(10) Patent No.: US 12,570,567 B2
(45) Date of Patent: Mar. 10, 2026

(54) GLASSES WITH HIGH REFRACTIVE POWER AND LOW DENSITY

(71) Applicant: Schott AG, Mainz (DE)

(72) Inventors: Ulrich Fotheringham, Wiesbaden (DE); Simone Monika Ritter, Mainz (DE); Bernd Rüdinger, Wörrstadt (DE); Peter Naß, Mainz (DE)

(73) Assignee: Schott AG, Mainz (DE)

( * ) Notice: Subject to any disclaimer, the term of this patent is extended or adjusted under 35 U.S.C. 154(b) by 995 days.

(21) Appl. No.: 17/725,024

(22) Filed: Apr. 20, 2022

(65) Prior Publication Data

US 2022/0332630 A1 Oct. 20, 2022

(30) Foreign Application Priority Data

Apr. 20, 2021 (DE) ..................... 10 2021 109 897.1

(51) Int. Cl.
| | |
|---|---|
| C03C 3/064 | (2006.01) |
| C03C 3/04 | (2006.01) |
| G02C 7/02 | (2006.01) |

(52) U.S. Cl.
CPC ............... *C03C 3/04* (2013.01); *G02C 7/022* (2013.01)

(58) Field of Classification Search
CPC ............................... C03C 3/068; C03C 3/155
See application file for complete search history.

(56) References Cited

U.S. PATENT DOCUMENTS

| | | | | |
|---|---|---|---|---|
| 4,584,279 A * | 4/1986 | Grabowski | ............. | C03C 3/155 501/901 |
| 2021/0179479 A1* | 6/2021 | Amma | ................ | C03C 17/3417 |

FOREIGN PATENT DOCUMENTS

| | | |
|---|---|---|
| JP | 60-33229 A | 2/1985 |
| JP | 2019-147724 A | 9/2019 |

OTHER PUBLICATIONS

German Office Action dated Jan. 10, 2022 for German Patent Application No. 10 2021 109 897.1 (7 pages).
"Chemical structure, medium range order, and crystalline reference state of multicomponent oxide liquids and glasses". Reinhard Conradt, Journal of Non-Crystalline Solids, vols. 345-346, Oct. 15, 2004, pp. 16-23 (8 pages).
"The state of the glass, Thermodynamics—Structure—Glass transition—Viscosity—Nucleation—Crystallisation Metallic glasses—Organic polymers—Organically modified materials", Chapter 1, Prof. Reinhardt Conradt, lecture Glas—Chemie, RWTH Aachen 2010 (197 pages).
"Revised Effective Ionic Radii and Systematic Studies of Interatomic Distances in Halides and Chalcogenides", R.D. Shannon, Acta Cryst., 1976, A32, 751 (17 pages).

"Effect of substituting Al2O3 and ZRO2, on the thermal and optical properties of high refractive index La2O3—TiO2, glass system prepared by containerless processing", H. Inoue et al., Optical Materials 33, 2011 1853-1857 (5 pages).
"Thermal and optical properties of La2O3—Nb2O5 high refractive index glasses", Mansuno et al., Optical Materials Express 4(4) Apr. 2014 (9 pages).
"Structue of MoO3—WO3—La2O3—B2O3 glasses and crystallization of LaMo1—xWxBO6 solid stations", Aleksandrov et al., Journal of Non-Crystalline Solids 429, 2015, 171-177 (7 pages).
"High refractive index La—rich lanthanum borate glasses composed of isolated BO3 units", Masuno et al., Dalton Trans., 2019, 48, 10804-10811 (20 pages).
"Physical, structural, optical, and radiation shielding properties of B2O3—Gd2O3—Y2O3 glass system", Y. Al-Hadeethi et al., Applied Physics A, 2019, 125:852 (7 pages).
"Glass Preparation of The ZrO2—SiO2 System By the Sol-Gel Process From Metal Alkoxides", Masayuki Nogami, Journal of Non-Crystalline Solids 69, 1985, 415-423 (9 pages).
"Boron and pentavalent vanadium local environments in binary vanadium borate glasses", Nattapol Laorodphan et al., Journal of Non-Crystalline Solids 453, 2016, 118-124 (7 pages).
The Density of Low Energy States in Vitreous Silica: Specific Heat and Thermal Conductivity Down to 25 mK, J.C. Lasjaunias et al., Solid State Communications, vol. 88, Nos. 11/12, pp. 1023-1027, 1993 (5 pages).
"Empirical electronic polarizabilities of ions for the prediction and interpretation of refractive indices: Oxides and oxysalts", Robert D. Shannon and Reinhard X. Fischer, American Mineralogist, vol. 101, pp. 2288-2300, 2016 (14 pages).
"The Structure of La4Ti9O24 From Synchrotron X-Ray Powder Diffraction", Russel E. Morris et al., J. Phys. Chem. Solids, vol. 56 No. 10, pp. 1297-1303, 1995 (7 pages).
"Enhanced anti-stocks luminescence in LaNbO4:Ln3+ (Ln3+ = Yb3+, Er3+/Ho3+/Tm3+) with abundant color", Huining Huang et al., RSC Advances, 2017, 7, 16777 (10 pages).
"Structure determination and characterization of two rare-earth molybdenum borate compounds: LnMoBO6 (Ln = La, Ce)", Dan Zhao et al., Dalton Transactions, 2008, 3709-3714 (6 pages).
"Aragonite-type lanthanum orthoborate, LaBO3", Akihiko Nakatsuka et al., Acta Crystallographica Section E62, i103- 105 (8 pages).
"Crystal structure and charge transfer energy of the vaterite-type orthoborate YBO3:Eu", Ling Li et al., Solid State Sciences 10, 2008, 1173-1178 (6 pages).
"Effect of Host Structure and Concentration on the Luminescence of Eu3+ and Tb3+ in Borate Phosphors", Jyotsna Thakur et al., J. Am. Ceram. Soc., 95 [2] 696-704, 2012, (9 pages).
"The Structure of Zircon: A Comparison With Garnet", Keith Robinson et al., The American Mineralogist vol. 56, 782-790, May-Jun. 1971 (9 pages).
"The Crystal Structure of Trigonal Diboron Trioxide", G.E. Gurr, et al., Acta Cryst., 1970, B26, 906-915 (10 pages).

(Continued)

*Primary Examiner* — Matthew E. Hoban
(74) *Attorney, Agent, or Firm* — TAYLOR & EDELSTEIN, PC

(57) ABSTRACT

A glass includes a composition characterized by the following constituent phases (in mol-%): 20-80 lanthanum titanate; 10-50 lanthanum niobate; 0-60 lanthanum molybdenum borate; 2-40 lanthanum borate; 2-40 yttrium borate; 0-40 gadolinium borate; 2-40 zirconium silicate; 2-40 diboron trioxide; and 0-20 silicon dioxide. A refractive index is at least 2.00.

18 Claims, No Drawings

(56)     References Cited

OTHER PUBLICATIONS

"Crystal Structures of Quartz and Magnesium Germanate by Profile Analysis of Synchrotron-Radiation High-Resolution Power Data", G. Will et all, J. Appl. Cryst., 1988, 21, 182-191 (10 pages).

* cited by examiner

GLASSES WITH HIGH REFRACTIVE POWER AND LOW DENSITY

CROSS REFERENCE TO RELATED APPLICATIONS

This application claims priority to German Patent Application No. DE 10 2021 109 897.1 filed on Apr. 20, 2021, which is incorporated in its entirety herein by reference.

BACKGROUND OF THE INVENTION

1. Field of the Invention

The invention relates to glasses having high refractive index with low density as well as the use of the glasses and a method for their production.

2. Description of the Related Art

Glasses with high refractive index and low density in particularly are needed in the field of the so-called "augmented reality." "Augmented reality" is a highly active technology development which addresses many applications, for example medicine, education, construction engineering, transport and entertainment. In contrast to "virtual reality" as related technology "augmented reality" is focused on the close integration of multimedia information and the measuring data of "real" sensors, typically by superimposing a digital image in eyeglasses.

The technical challenges of this field arise from the simultaneous requirement of a good optical representation of the real world, a good superimposition of the digital information and a good wearing comfort.

The prior art lacks glasses with high refractive power, typically above 2.1, and at the same time relatively low density, typically below 5.25 g/cm³, as well as low tendency to crystallization. The glasses of prior art with the desired values for refractive index and density are consistently characterized by a low number of constituent phases, resulting in a regular structure and thus in susceptibility to crystallization.

SUMMARY OF THE INVENTION

In some exemplary embodiments provided according to the present invention, a glass includes a composition characterized by the following constituent phases (in mol-%): 20-80 lanthanum titanate; 10-50 lanthanum niobate; 0-60 lanthanum molybdenum borate; 2-40 lanthanum borate; 2-40 yttrium borate; 0-40 gadolinium borate; 2-40 zirconium silicate; 2-40 diboron trioxide; and 0-20 silicon dioxide. A refractive index $n_D$ calculated according to the following formula $$n_D = \sqrt{\frac{4\pi\alpha}{\left(2.26 - \frac{4\pi}{3}\right)\alpha + V_m} + 1}$$

is at least 2.00. $\alpha$ is a polarizability of a molecular unit of the glass and $V_m$ is a molecular volume.

In some exemplary embodiments provided according to the present invention, a glass includes a composition characterized by the following constituent phases (in mol-%): 20-80 lanthanum titanate; 10-50 lanthanum niobate; 0-60 lanthanum molybdenum borate; 2-40 lanthanum borate; 2-40 yttrium borate; 0-40 gadolinium borate; 2-40 zirconium silicate; 2-40 diboron trioxide; and 0-20 silicon dioxide. A quotient of a density $\rho$ calculated according to the following formula (1)

$$\rho = \frac{\sum_{i=1}^{n} c_i \cdot M_i}{\sum_{i=1}^{n} c_i \cdot \frac{M_i}{\rho_i}}$$

and a refractive index $n_D$ calculated according to the following formula (4)

$$n_D = \sqrt{\frac{4\pi\alpha}{\left(2.26 - \frac{4\pi}{3}\right)\alpha + V_m} + 1}$$

is at most 2.50 g/cm³. $M_i$ is a molar mass of each constituent phase, $\rho_i$ is a density of each constituent phase, $c_i$ is a molar proportion of each constituent phase, $\alpha$ is a polarizability of a molecular unit of the glass, and $V_m$ is a molecular volume.

In some exemplary embodiments provided according to the present invention, a glass includes a composition characterized by the following constituent phases (in mol-%): 20-60 lanthanum titanate; 20-40 lanthanum niobate; 0-20 lanthanum molybdenum borate; 4-20 lanthanum borate; 4-20 yttrium borate; 0-20 gadolinium borate; 4-20 zirconium silicate; 4-20 diboron trioxide; and 0-10 silicon dioxide.

DETAILED DESCRIPTION OF THE INVENTION

Exemplary embodiments disclosed herein provide a targeted combination of stoichiometric glasses, thus glasses which in the same stoichiometry also exist as crystals, and the property of which can be assumed as being very similar each for glass and crystal due to the identical topology of the assemblies—such as verified in a lot of examples in literature by NMR measurements or the like. For this, special stoichiometric glasses are selected, wherein with a mixture thereof a behavior in the sense of a solution according to the present invention can be attained. In this application, these stoichiometric glasses are also referred to as "base glasses" or "constituent phases".

It is not a new concept to describe glasses by the constituent phases to be assigned to them. By specifying the base glasses, it is possible to draw conclusions with respect to the chemical structure of a glass (cf. Conradt R: "Chemical structure, medium range order, and crystalline reference state of multicomponent oxide liquids and glasses", in Journal of Non-Crystalline Solids, Volumes 345-346, 15 Oct. 2004, pages 16-23).

In the present case here, the description by constituent phases is of considerable advantage, because, as will be shown in the following, the two decisive target variables, namely the density and the refractive index, can be calculated in a good approximation without constraint from the composition given in constituent phases, whereas the calculation from the composition given in single oxides is very troublesome.

The selection of the suitable constituent phases takes into account that the refractive index depends on the atomic polarizabilities which on their part depend on the volume of the individual atoms or ions. In oxidic glasses, inter alia the oxygen ions make the largest contribution to this. For a high refractive index, therefore, oxygen ions must be packed as densely as possible. This is achieved first and foremost by using ions of high valency, the radius of which is so large that an octahedral coordination can result according to Pauling's packing rules. In addition, these ions should not be too heavy, because of the required low density. When in view of the fact that the constituent phases should exist for themselves as glass, it is demanded at the same time that these ions are at least so-called "imperfect glass formers" in the sense of the nomenclature of Prof. Reinhardt Conradt, lecture Glas-Chemie, RWTH Aachen 2010, then titanium, vanadium, niobium and molybdenum come into consideration for this purpose, wherein vanadium due to the associated redox problems is not preferred. The respective constituent phase results from the combination of an imperfect glass former with a network modifier, in the present case a (because of the dense packing of the oxygen atoms) highly valent network modifier such as lanthanum, yttrium or gadolinium.

We therefore at first select as constituent phases: lanthanum titanate, lanthanum niobate and optionally lanthanum molybdenum borate.

In the last-mentioned constituent phase with boron a perfect glass former is still contained. For obtaining a glass being not characterized by a tendency to crystallization which cannot be handled technically, a certain portion of perfect glass formers is required.

In addition, we therefore select as further constituent phases lanthanum borate, yttrium borate and optionally gadolinium borate as well as the pure glass formers diboron trioxide and optionally silicon dioxide.

Furthermore, in addition, we select as constituent phase zirconium silicate. Zirconium has the above desired properties of high valency and appropriate radius, but it is not a glass former so that it can only be used as a constituent phase in combination with a glass former.

The larger of the ions mentioned, thus all except boron and silicon, are all dimensioned such that an octahedral coordination is possible, however they have sufficiently different radii, cf. Robert Shannon, Revised Effective Ionic Radii and Systematic Studies of Interatomic Distances in Halides and Chalcogenides, Acta Cryst. (1976) A32, 751, so that also lower and higher coordinations may result. This effect is desired, because it counteracts a regular atomic structure and the tendency to crystallization.

The present invention thus relates to a glass having a composition which is characterized by the following constituent phases of the glass:

TABLE 1

| Constituent phase | Min. (% by mol) | Max. (% by mol) |
| --- | --- | --- |
| lanthanum titanate | 20 | 80 |
| lanthanum niobate | 10 | 50 |
| lanthanum molybdenum borate | 0 | 60 |
| lanthanum borate | 2 | 40 |
| yttrium borate | 2 | 40 |
| gadolinium borate | 0 | 40 |
| zirconium silicate | 2 | 40 |
| diboron trioxide | 2 | 40 |
| silicon dioxide | 0 | 20 |

Furthermore, the glass according to the present invention should fulfil further conditions which are associated via formulas with the composition based on constituent phases, wherein these relationships are explained below.

At first, we specify conversion matrices for the mutual conversion of the composition data in single oxides and in constituent phases.

Conversion of the Composition Based on Constituent Phases into the Composition Based on Single Oxides and Vice Versa:

The composition in constituent phases is given for the purpose of conversion in the following normalized form:

TABLE 2

| Constituent phase | Formula (normalized with respect to a single oxide) |
| --- | --- |
| lanthanum titanate | $(2La_2O_3 \cdot 9TiO_2)/11$ |
| lanthanum niobate | $(La_2O_3 \cdot Nb_2O_5)/2$ |
| lanthanum molybdenum borate | $(La_2O_3 \cdot 2MoO_3 \cdot B_2O_3)/4$ |
| lanthanum borate | $(La_2O_3 \cdot B_2O_3)/2$ |
| yttrium borate | $(Y_2O_3 \cdot B_2O_3)/2$ |
| gadolinium borate | $(Gd_2O_3 \cdot B_2O_3)/2$ |
| zirconium silicate | $(ZrO_2 \cdot SiO_2)/2$ |
| diboron trioxide | $B_2O_3$ |
| silicon dioxide | $SiO_2$ |

The conversion of these compositions into composition data in % by mol with respect to the following single oxides . . . .

| # | Oxide |
| --- | --- |
| 1. | $La_2O_3$ |
| 2. | $Y_2O_3$ |
| 3. | $Gd_2O_3$ |
| 4. | $ZrO_2$ |
| 5. | $TiO_2$ |
| 6. | $Nb_2O_5$ |
| 7. | $MoO_3$ |
| 8. | $B_2O_3$ |
| 9. | $SiO_2$ | is conducted with the help of the matrix given here. In this case, the matrix on its right side is multiplied with the composition data in % by mol with respect to the base glasses as column vector.

| Matrix | | | | | | | | | | |
| --- | --- | --- | --- | --- | --- | --- | --- | --- | --- | --- |
| 2/11 | 1/2 | 1/4 | 1/2 | 0 | 0 | 0 | 0 | 0 | x | $(2La_2O_3 \cdot 9TiO_2)/11$ |
| 0 | 0 | 0 | 0 | 1/2 | 0 | 0 | 0 | 0 | | $(La_2O_30Nb_2O5)/2$ |
| 0 | 0 | 0 | 0 | 0 | 1/2 | 0 | 0 | 0 | | $(La_2O_3 \cdot 2MoO_3 \cdot B_2O_3)/4$ |
| 0 | 0 | 0 | 0 | 0 | 0 | 1/2 | 0 | 0 | | $(La_2O_3 \cdot B_2O_3)/2$ |
| 9/11 | 0 | 0 | 0 | 0 | 0 | 0 | 0 | 0 | | $(Y_2O_3 \cdot B_2O_3)/2$ |
| 0 | 1/2 | 0 | 0 | 0 | 0 | 0 | 0 | 0 | | $(Gd_2O_3 \cdot B_2O_3)/2$ |
| 0 | 0 | 1/2 | 0 | 0 | 0 | 0 | 0 | 0 | | $(ZrO_2 \cdot SiO_2)/2$ |
| 0 | 0 | 1/4 | 1/2 | 1/2 | 1/2 | 0 | 1 | 0 | | $B_2O_3$ |
| 0 | 0 | 0 | 0 | 0 | 0 | 1/2 | 0 | 1 | | $SiO_2$ |

As a result of the multiplication of the column vector with the matrix the composition of the glass in percent by mol is obtained.

Conversely, a composition in percent by mol can simply be converted via the respective inverse matrix into a base glass composition. Here, of course, only such base glass compositions are according to the present invention which, when converted, do not result in negative values for the base glasses.

Importance of the Constituent Phases and their Selection

The composition is chosen with regard to the constituent phases of the glass within the limits described herein. The constituent phases of the glass are, of course, not crystalline as such in the glass product, but amorphous. But this does not mean that the constituent phases in the amorphous state have completely different assemblies than in the crystalline state. As mentioned previously, the topology of the assemblies is comparable, thus, e.g., the coordination of the cations involved with surrounding oxygen atoms or the interatomic distance resulting from the coordination and the strength of the bond between these cations and surrounding oxygen atoms. Therefore, it is possible to describe many properties of the glass provided according to the invention very well by the constituent phases, in particularly for illustrating the inventive benefit and the problems which are overcome with embodiments provided according to the invention (for that, cf. Conradt R., loc. cit.). Here, of course, the glass can be produced not only using the corresponding crystals, but also using the usual glass raw materials, as long as only the stoichiometric ratios allow the formation of the corresponding assemblies of the base glasses.

In the following, calculation methods with which the above-mentioned key variables density and refractive index can be calculated from a given composition based on constituent phases are described. These calculation methods are instrumental in selecting the composition of a glass according to the present invention from these constituent phases.

Density

Remarkably, it is possible to calculate the density $\rho$ of the glass in a very simple manner via the lever principle from the molar masses $M_i$ and densities $\rho_i$ of the constituent phases and their molar proportions $c_i$:

$$\rho = \frac{\sum_{i=1}^{n} c_i \cdot M_i}{\sum_{i=1}^{n} c_i \cdot \frac{M_i}{\rho_i}} \qquad (1)$$

Here, the numerator of (1) is the molar mass, the denominator is the molar volume $V_{mol}$ of the glass.

The molar masses, density values and molar volumes are tabulated in the following.

able to be produced by correspondingly rapid cooling is the same as that of crystalline $La_2O_3 \cdot Nb_2O_5$), Journal of Non-Crystalline Solids 429 (2015) 171-177 ($La_2O_3 \cdot 2MoO_3 \cdot B_2O_3$), Dalton Trans., 2019, 48, 10804 ($La_2O_3 \cdot B_2O_3$), Applied Physics A (2019) 125:852 ($Y_2O_3 \cdot B_2O_3$, $Gd_2O_3 \cdot B_2O_3$; from the density data listed there for the $Y_2O_3 \cdot Gd_2O_3 \cdot B_2O_3$ system the density values of glassy 30% by mol $Y_2O_3 \cdot 70\%$ by mol $B_2O_3$ and glassy 30% by mol $Gd_2O_3 \cdot 70\%$ by mol $B_2O_3$ are determined by linear extrapolation; the density values of glassy 50% by mol $Y_2O_3 \cdot 50\%$ by mol $B_2O_3$ and glassy 50% by mol $Gd_2O_3 \cdot 50\%$ by mol $B_2O_3$ are assessed from the values for glassy $B_2O_3$, glassy 30% by mol $Y_2O_3 \cdot 70\%$ by mol $B_2O_3$ and glassy 30% by mol $Gd_2O_3 \cdot 70\%$ by mol $B_2O_3$ and glassy $Y_2O_3$ and glassy $Gd_2O_3$ with quadratic interpolation), Journal of Non-Crystalline Solids 69 (1985) 415-423 ($ZrO_2 \cdot SiO_2$), Journal of Non-Crystalline Solids 453 (2016) 118-124 ($B_2O_3$), Solid State Communications, Vol. 88, Nos. 11/12, pp. 1023-1027, 1993 ($SiO_2$).

The density of the glasses provided according to the invention calculated according to formula (1) may be less than 5.30 g/cm$^3$, at most 5.25 g/cm$^3$, at most 5.20 g/cm$^3$, at most 5.15 g/cm$^3$, at most 5.10 g/cm$^3$, at most 5.05 g/cm$^3$, at most 5.00 g/cm$^3$, at most 4.95 g/cm$^3$, at most 4.90 g/cm$^3$, at most 4.85 g/cm$^3$, at most 4.80 g/cm$^3$, at most 4.75 g/cm$^3$, at most 4.70 g/cm$^3$ or at most 4.65 g/cm$^3$. The density of the glasses calculated according to formula (1) may be 4.00 g/cm$^3$ or more, for example at least 4.05, at least 4.10 g/cm$^3$, at least 4.15 g/cm$^3$, at least 4.20 g/cm$^3$, at least 4.25 g/cm$^3$, at least 4.30 g/cm$^3$, at least 4.35 g/cm$^3$, at least 4.40 g/cm$^3$, at least 4.45 g/cm$^3$ or at least 4.50 g/cm$^3$. The density of the glasses provided according to the invention calculated according to formula (1) may, for example, be in a range of 4.00 g/cm$^3$ to 5.30 g/cm$^3$, for example in a range of 4.05 g/cm$^3$ to 5.25 g/cm$^3$, of 4.10 g/cm$^3$ to 5.20 g/cm$^3$, of 4.10 g/cm$^3$ to 5.15 g/cm$^3$, of 4.15 g/cm$^3$ to 5.10 g/cm$^3$, of 4.20 g/cm$^3$ to 5.05 g/cm$^3$, of 4.20 g/cm$^3$ to 5.00 g/cm$^3$, of 4.25 g/cm$^3$ to 4.95 g/cm$^3$, of 4.30 g/cm$^3$ to 4.90 g/cm$^3$, of 4.30 g/cm$^3$ to 4.85 g/cm$^3$, of 4.35 g/cm$^3$ to 4.80 g/cm$^3$, of 4.40 g/cm$^3$ to 4.75 g/cm$^3$, of 4.45 g/cm$^3$ to 4.70 g/cm$^3$ or of 4.50

TABLE 3

Molar masses, densities and molar ion volumes of the normalized constituent phases

| Constituent phase | Formula (normalized with respect to a single oxide) | $M_i$/g | $\rho_i$/ (g/cm$^3$) | Molar volume/ cm$^3$ |
|---|---|---|---|---|
| lanthanum titanate | $(2La_2O_3 \bullet 9TiO_2)/11$ | 124.5820909 | 4.97 | 25.0668191 |
| lanthanum niobate | $(La_2O_3 \bullet Nb_2O_5)/2$ | 295.81238 | 5.9 | 50.13769153 |
| lanthanum molybdenum borate | $(La_2O_3 \bullet 2MoO_3 \bullet B_2O_3)/4$ | 170.8325 | 4.674 | 36.54952931 |
| lanthanum borate | $(La_2O_3 \bullet B_2O_3)/2$ | 197.718 | 5.3 | 37.30528302 |
| yttrium borate | $(Y_2O_3 \bullet B_2O_3)/2$ | 147.71385 | 4.46 | 33.11969731 |
| gadolinium borate | $(Gd_2O_3 \bullet B_2O_3)/2$ | 216.058 | 5.965 | 36.22095557 |
| zirconium silicate | $(ZrO_2 \bullet SiO_2)/2$ | 91.653 | 3.961 | 23.13885382 |
| diboron trioxide | $B_2O_3$ | 69.619 | 1.82 | 38.2521978 |
| silicon dioxide | $SiO_2$ | 60.084 | 2.203 | 27.27371766 |

The density values can be found in Optical Materials 33 (2011) 1853-1857 ($2La_2O_3 \cdot 9TiO_2$), Optical Materials Express 4(4) April 2014 ($La_2O_3 \cdot Nb_2O_5$; from the density values listed there for different $La_2O_3/Nb_2O_5$ mixtures follows that the density of glassy $La_2O_3 \cdot Nb_2O_5$ which must be g/cm$^3$ to 4.65 g/cm$^3$. The density of the glasses provided according to the invention calculated according to formula (1) may, for example, also be in a range of 4.60 g/cm$^3$ to 5.25 g/cm$^3$, of 4.75 g/cm$^3$ to 5.24 g/cm$^3$, of 4.78 g/cm$^3$ to 5.23 g/cm$^3$, of 4.85 g/cm$^3$ to 5.21 g/cm$^3$, of 4.90 g/cm$^3$ to 5.20 g/cm³, of 4.91 g/cm³ to 5.19 g/cm³, of 4.92 g/cm³ to 5.18 g/cm³, of 4.93 g/cm³ to 5.17 g/cm³, of 4.94 g/cm³ to 5.16 g/cm³, of 4.95 g/cm³ to 5.15 g/cm³, of 4.96 g/cm³ to 5.14 g/cm³, of 4.97 g/cm³ to 5.13 g/cm³, of 4.98 g/cm³ to 5.12 g/cm³, of 4.99 g/cm³ to 5.11 g/cm³ or of 5.00 g/cm³ to 5.10 g/cm³.

In some embodiments, the density of the glasses calculated according to formula (1) may be 5.00 g/cm³ or more, for example at least 5.01, at least 5.02 g/cm³, at least 5.03 g/cm³, at least 5.04 g/cm³, at least 5.05 g/cm³, at least 5.06 g/cm³, at least 5.07 g/cm³, at least 5.08 g/cm³, at least 5.09 g/cm³ or at least 5.10 g/cm³. The density of the glasses provided according to the invention calculated according to formula (1) may be in a range of 5.00 g/cm³ to 5.30 g/cm³, of 5.01 g/cm³ to 5.25 g/cm³, of 5.02 g/cm³ to 5.20 g/cm³, of 5.03 g/cm³ to 5.15 g/cm³ or of 5.04 g/cm³ to 5.10 g/cm³.

Refractive Index

The refractive index (BZ) refers to the wavelength 589.3 nm; thus it is the value which is normally referred to as "$n_D$". The calculation of this refractive index is conducted according to Shannon and Fischer, American Mineralogist, Volume 101, pages 2288-2300, 2016.

The calculation method of Shannon and Fischer refers to crystals; but it can also be transferred to glass, if one proceeds as follows: (1) One starts with the composition given in constituent phases. (2) For each phase, according to Shannon and Fischer the polarizability of one molecular unit is calculated; here according to the approach of Conradt for the polarizability of the cations the value which each results for the coordination number assumed in the crystal is used, but in the calculation of the polarizability of the oxygen ions for the molecular volume which is necessary for this the value which results from the use of the density in the glassy state is used; wherein the values of the polarizabilities of the constituent phases are tabulated below. (3) The polarizability $\alpha$ of a molecular unit of the glass is calculated by multiplying the polarizabilities $\alpha_i$ of the constituent phases with the respective molar portion $c_i$ and summing up.

$$\alpha = \Sigma_{i+1}{}^n c_i \cdot \alpha_i \qquad (2)$$

(4) The molecular volume $V_m$ (normal unit Å³) is calculated from the molar volume $V_{mol}$ (normal unit cm³) by dividing by the Avogadro's number 6.023*10²³.

$$\frac{V_m}{\text{Å}^3} = \frac{10^{24}}{N_A} \cdot \frac{V_{mol}}{\text{cm}^3} \qquad (1)$$

The molecular volume $V_m$ of the glass can be expressed as follows using the molar proportion of each constituent phase ($c_i$) and the respective molar volume $V_{moli}$:

$$V_m = \Sigma_{i=1}{}^n 10^{24}/N_A \cdot V_{moli}/cm^3 \cdot c_i$$

(5) The refractive index $n_D$ is calculated according to Shannon and Fischer, loc. cit.

$$n_D = \sqrt{\frac{4\pi\alpha}{\left(2.26 - \frac{4\pi}{3}\right)\alpha + V_m} + 1} \qquad (4)$$

The polarizabilities of the constituent phases are tabulated in the following.

TABLE 4

Polarizabilities of the normalized constituent phases

| Constituent phase | Formula (normalized with respect to a single oxide) | $\alpha_i$ |
|---|---|---|
| lanthanum titanate | (2La₂O₃•9TiO₂)/11 | 9.119538223 |
| lanthanum niobate | (La₂O₃•Nb₂O₅)/2 | 16.39292835 |
| lanthanum molybdenum borate | (La₂O₃•2MoO₃•B₂O₃)/4 | 8.874347232 |
| lanthanum borate | (La₂O₃•B₂O₃)/2 | 8.98974281 |
| yttrium borate | (Y₂O₃•B₂O₃)/2 | 7.558043681 |
| gadolinium borate | (Gd₂O₃•B₂O₃)/2 | 8.376326033 |
| zirconium silicate | (ZrO₂•SiO₂)/2 | 5.193896624 |
| diboron trioxide | B₂O₃ | 5.075206993 |
| silicon dioxide | SiO₂ | 3.533771705 |

The data regarding the coordination numbers of the cations required for the calculation of the polarizabilities of the constituent phases can be found in J. Phys. Chem. Solids, Vol. 56 No. 10, pp. 1297-1303, 1995 (2La₂O₃·9TiO₂), RSC Adv., 2017, 7, 16777 (La₂O₃·Nb₂O₅), Dalton Trans., 2008, 3709-3714 (La₂O₃·2MoO₃·B₂O₃), Acta Cryst. (2006). E62, i103-i105 (La₂O₃·B₂O₃), Solid State Sciences 10 (2008) 1173-1178 (Y₂O₃·B₂O₃), J. Am. Ceram. Soc., 95 [2] 696-704 (2012) (Gd₂O₃·B₂O₃), The American Mineralogist Vol. 56, 782-790, May-June (1971) (ZrO₂·SiO₂), Acta Cryst. (1970). B26, 906-915 (B₂O₃), J. Appl. Cryst. (1988). 21, 182-191 (SiO₂).

The refractive index $n_D$ of the glasses provided according to the invention calculated according to formula (4) may be at least 2.00, for example at least 2.01, at least 2.02, at least 2.03, at least 2.04, at least 2.05, at least 2.06, at least 2.07, at least 2.08, at least 2.09, at least 2.10, for example at least 2.11, at least 2.12, at least 2.13, at least 2.14, at least 2.15, at least 2.16, at least 2.17, at least 2.18, at least 2.19, at least 2.20, at least 2.21, at least 2.22, at least 2.23 or at least 2.24. The refractive index $n_D$ calculated according to formula (4) may be less than 2.30, for example at most 2.29, at most 2.28, at most 2.27, at most 2.26 or at most 2.25. The refractive index $n_D$ of the glasses provided according to the invention calculated according to formula (4) may, for example, be in a range of 2.00 to 2.30, of 2.01 to 2.30, of 2.02 to 2.30, of 2.03 to 2.30, of 2.04 to 2.30, of 2.05 to 2.30, of 2.06 to 2.30, of 2.07 to 2.30, of 2.08 to 2.30, of 2.09 to 2.30 or of 2.10 to 2.30, in a range of 2.11 to 2.30, of 2.12 to 2.30, of 2.13 to 2.29, of 2.14 to 2.29, of 2.15 to 2.28, of 2.16 to 2.28, of 2.17 to 2.28, of 2.18 to 2.27, of 2.19 to 2.27, of 2.20 to 2.26, of 2.21 to 2.26, of 2.22 to 2.25, of 2.23 to 2.25 or of 2.24 to 2.25.

Selection of Suitable Constituent Phases

The portions of the phases according to the present invention are selected such that glasses having high refractive index with relatively low density are obtained. In particularly, the quotient of the density calculated according to formula (1) and the refractive index $n_D$ calculated according to formula (4) may be at most 2.50 g/cm³, such as at most 2.45 g/cm³, at most 2.40 g/cm³, at most 2.35 g/cm³, at most 2.30 g/cm³, at most 2.25 g/cm³, at most 2.20 g/cm³ or at most 2.15 g/cm³. The quotient of the density calculated according to formula (1) and the refractive index $n_D$ calculated according to formula (4) may be at least 2.00 g/cm³, for example at least 2.05 g/cm³ or at least 2.10 g/cm³. The quotient of the density calculated according to formula (1) and the refractive index $n_D$ calculated according to formula (4) may, for example, be in a range of 2.00 g/cm³ to 2.50 g/cm³, of 2.00 g/cm³ to 2.45 g/cm³, of 2.00 g/cm³ to 2.40 g/cm³, of 2.05 g/cm³ to 2.35 g/cm³, of 2.05 g/cm³ to 2.30

$g/cm^3$, of 2.10 $g/cm^3$ to 2.25 $g/cm^3$, of 2.15 $g/cm^3$ to 2.20 $g/cm^3$ or of 2.10 $g/cm^3$ to 2.15 $g/cm^3$.

Lanthanum Titanate

A base glass which is present in the glass provided according to the invention as constituent phase is lanthanum titanate glass.

The portion of lanthanum titanate is in a range of 20 to 80% by mol, for example in a range of 20 to 70% by mol, of 20 to 60% by mol, of 25 to 55% by mol, of 30 to 50% by mol or of 35 to 45% by mol.

The portion of lanthanum titanate may, for example, be at least 20% by mol, at least 25% by mol, at least 30% by mol, at least 35% by mol or at least 40% by mol. The portion of lanthanum titanate may, for example, be at most 80% by mol, at most 70% by mol, at most 60% by mol, at most 55% by mol, at most 50% by mol or at most 45% by mol.

According to the present invention, one mol of lanthanum titanate means one mol of $(2La_2O_3\cdot9TiO_2)/11$.

Lanthanum Niobate

The portion of lanthanum niobate is in a range of 10 to 50% by mol, for example in a range of 15 to 45% by mol, of 20 to 40% by mol or of 25 to 35% by mol.

The portion of lanthanum niobate may, for example, be at least 10% by mol, at least 15% by mol, at least 20% by mol or at least 25% by mol. The portion of lanthanum niobate may, for example, be at most 50% by mol, at most 45% by mol, at most 40% by mol or at most 35% by mol.

According to the present invention, one mol of lanthanum niobate means one mol of $(La_2O_3\cdot Nb_2O_5)/2$.

In some embodiments, the ratio of the portion of lanthanum titanate to the portion of lanthanum niobate is in a range of 0.5:1 to 8:1, for example of 0.7:1 to 7.5:1, of 0.8:1 to 7:1, of 0.9:1 to 6.5:1, of 1:1 to 6:1, of >1:1 to 5.5:1, of 1.1:1 to 5:1, of 1.2:1 to 4.5:1, of 1.5:1 to 4:1, of 1.75:1 to 3.5:1 or of 2:1 to 3:1. The ratio of the portion of lanthanum titanate to the portion of lanthanum niobate may, for example, be at least 0.5:1, at least 0.7:1, at least 0.8:1, at least 0.9:1, at least 1:1, higher than 1:1, at least 1.1:1, at least 1.2:1, at least 1.5:1, at least 1.75:1 or at least 2:1. The ratio of the portion of lanthanum titanate to the portion of lanthanum niobate is, for example, at most 8:1, at most 7.5:1, at most 7:1, at most 6.5:1, at most 6:1, at most 5.5:1, at most 5:1, at most 4.5:1, at most 4:1, at most 3.5:1 or at most 3:1.

The sum of the portions of lanthanum titanate and lanthanum niobate may be at least 50% by mol, at least 55% by mol or at least 60% by mol. In some embodiments, the sum of the portions of lanthanum titanate and lanthanum niobate is in a range of 50 to 90% by mol, for example of 55 to 85% by mol or of 60 to 80% by mol. The sum of the portions of lanthanum titanate and lanthanum niobate may, for example, be at most 90% by mol, at most 85% by mol or at most 80% by mol.

Lanthanum Molybdenum Borate

The portion of lanthanum molybdenum borate is in a range of 0 to 60% by mol. Thus, the glasses provided according to the invention may be free of lanthanum molybdenum borate. The portion of lanthanum molybdenum borate may be in a range of 0 to 20% by mol, for example of 0 to 15% by mol, of 0 to 10% by mol, of 0 to 5% by mol, of 0 to 2% by mol or of 0 to 1% by mol.

The portion of lanthanum molybdenum borate is, for example, at most 60% by mol, at most 20% by mol, at most 15% by mol, at most 10% by mol, at most 5% by mol, at most 2% by mol or at most 1% by mol. In some embodiments, the portion of lanthanum molybdenum borate may, for example, also be at least 1% by mol, at least 2% by mol, at least 4% by mol or at least 10% by mol.

According to the present invention, one mol of lanthanum molybdenum borate means one mol of $(La_2O_3\cdot2MoO_3\cdot B_2O_3)/4$.

Lanthanum Borate

The portion of lanthanum borate is in a range of 2 to 40% by mol, for example in a range of 3 to 30% by mol, of 4 to 20% by mol or of 5 to 15% by mol.

The portion of lanthanum borate may, for example, be at least 2% by mol, at least 3% by mol, at least 4% by mol or at least 5% by mol. The portion of lanthanum borate may, for example, be at most 40% by mol, at most 30% by mol, at most 20% by mol or at most 15% by mol.

According to the present invention, one mol of lanthanum borate means one mol of $(La_2O_3\cdot B_2O_3)/2$.

Yttrium Borate

The portion of yttrium borate is in a range of 2 to 40% by mol, for example in a range of 3 to 30% by mol, of 4 to 20% by mol or of 5 to 15% by mol.

The portion of yttrium borate may, for example, be at least 2% by mol, at least 3% by mol, at least 4% by mol or at least 5% by mol. The portion of yttrium borate may, for example, be at most 40% by mol, at most 30% by mol, at most 20% by mol or at most 15% by mol.

According to the present invention, one mol of yttrium borate means one mol of $(Y_2O_3\cdot B_2O_3)/2$.

Gadolinium Borate

The portion of gadolinium borate is in a range of 0 to 40% by mol. Thus, the glasses provided according to the invention may be free of gadolinium borate. The portion of gadolinium borate may be in a range of 0 to 20% by mol, for example of 0 to 15% by mol, of 0 to 10% by mol, of 0 to 5% by mol, of 0 to 2% by mol or of 0 to 1% by mol.

The portion of gadolinium borate is, for example, at most 40% by mol, at most 20% by mol, at most 15% by mol, at most 10% by mol, at most 5% by mol, at most 2% by mol or at most 1% by mol. In some embodiments, the portion of gadolinium borate may, for example, also be at least 1% by mol, at least 2% by mol, at least 4% by mol or at least 10% by mol.

According to the present invention, one mol of gadolinium borate means one mol of $(Gd_2O_3\cdot B_2O_3)/2$.

Zirconium Silicate

The portion of zirconium silicate is in a range of 2 to 40% by mol, for example in a range of 3 to 30% by mol, of 4 to 20% by mol or of 5 to 15% by mol.

The portion of zirconium silicate may, for example, be at least 2% by mol, at least 3% by mol, at least 4% by mol or at least 5% by mol. The portion of zirconium silicate may, for example, be at most 40% by mol, at most 30% by mol, at most 20% by mol or at most 15% by mol.

According to the present invention, one mol of zirconium silicate means one mol of $(ZrO_2\cdot SiO_2)/2$.

Diboron Trioxide and Silicon Dioxide

Also portions of a base glass made of diboron trioxide and/or a base glass made of silicon dioxide may be provided.

The portion of diboron trioxide as base glass is in a range of 2 to 40% by mol, for example in a range of 3 to 30% by mol, of 4 to 20% by mol or of 5 to 15% by mol.

The portion of diboron trioxide as base glass may, for example, be at least 2% by mol, at least 3% by mol, at least 4% by mol or at least 5% by mol. The portion of diboron trioxide as base glass may, for example, be at most 40% by mol, at most 30% by mol, at most 20% by mol or at most 15% by mol.

The portion of silicon dioxide as base glass is in a range of 0 to 20% by mol. Thus, the glasses provided according to the invention can be free of silicon dioxide as base glass. The portion of silicon dioxide as base glass may be in a range of 0 to 15% by mol, of 0 to 10% by mol, of 0 to 5% by mol, of 0 to 2% by mol or of 0 to 1% by mol.

The portion of silicon dioxide as base glass is, for example, at most 20% by mol, at most 15% by mol, at most 10% by mol, at most 5% by mol, at most 2% by mol or at most 1% by mol. In some embodiments, the portion of silicon dioxide as base glass may, for example, also be at least 1% by mol, at least 2% by mol or at least 4% by mol.

In some embodiments, the portion of silicon dioxide as base glass is lower than the portion of diboron trioxide as base glass. Thus, the ratio of the portion of silicon dioxide to diboron trioxide may be in a range of 0 to <1.

The sum of the portions of diboron trioxide and silicon dioxide as base glasses may be in a range of 2 to 30% by mol, such as 3 to 25% by mol, for example of 4 to 20% by mol or of 5 to 15% by mol. The sum of the portions of diboron trioxide and silicon dioxide as base glasses may, for example, be at least 2% by mol, at least 3% by mol, at least 4% by mol or at least 5% by mol. The sum of the portions of diboron trioxide and silicon dioxide as base glasses may, for example, be at most 30% by mol, at most 25% by mol, at most 20% by mol or at most 15% by mol.

Further Components

In addition to the already mentioned components the glass can contain further constituents which here are referred to as "balance". The portion of the balance of the glass provided according to the present invention may be at most 3% by mol, so that the glass properties which are adjusted by careful selection of suitable base glasses are not compromised. In some embodiments, the portion of the balance in the glass is at most 2% by mol, at most 1% by mol or at most 0.5% by mol. The balance may contain oxides which are not contained in the base glasses mentioned here. So, in particularly, the balance does not contain $La_2O_3$, $Y_2O_3$, $Gd_2O_3$, $ZrO_2$, $TiO_2$, $Nb_2O_5$, $MoO_3$, $B_2O_3$ or $SiO_2$.

When in this description is mentioned that the glasses are free of a component or a constituent phase or that they do not contain a certain component or constituent phase, then this means that it is only allowed for this component or constituent phase to be present in the glasses as an impurity. This means that it is not added in substantial amounts. According to the present invention, not substantial amounts are amounts of less than 1000 ppm (molar), or less than 300 ppm (molar), for example less than 100 ppm (molar), less than 50 ppm (molar) and less than 10 ppm (molar).

With regard to their toxicity, in some embodiments the glasses do not contain CdO and $ThO_2$. The glasses, in some embodiments, do not contain $Yb_2O_3$, because with regard to the density the more lightweight $La_2O_3$ and $Gd_2O_3$ compounds are used. In some embodiments, the glasses do not contain $Ta_2O_5$ and $WO_3$, because with regard to the density the more lightweight $Nb_2O_5$ and $MoO_3$ compounds are used. The glasses, in some embodiments, do not contain alkali and/or alkaline earth metal oxides, because with regard to an object to pack as many oxygen atoms as possible as densely as possible they are not expedient and the compounds according to the present invention with higher-valence cations are used instead. Exceptions are $Rb_2O$ and $Cs_2O$. With regard to their high coordination numbers, as they follow from Pauling's packing rules, they interfere with the regular structure of predominantly octahedrally or tetrahedrally arranged oxygen atoms, and thus they counteract the tendency to crystallization of the glass.

In some embodiments, the glass may contain a portion of at least 0.5% by mol of $Rb_2O$, such as at least 0.6% by mol, at least 0.7% by mol, at least 0.8% by mol, at least 0.9% by mol or at least 1% by mol. Here, due to its more favorable influence onto the transmittance, $Rb_2O$ in comparison to $Cs_2O$ may be provided. However, with regard to the associated costs a portion of at least 0.5% by mol of $Cs_2O$ is also possible, for example at least 0.6% by mol, at least 0.7% by mol, at least 0.8% by mol, at least 0.9% by mol or at least 1% by mol. Also combinations of the mentioned $Rb_2O$ and $Cs_2O$ portions are possible. Thus, the glass may contain $Rb_2O$ and/or $Cs_2O$. The sum of the portions of $Rb_2O$ and $Cs_2O$ may, for example, be in a range of 0.5 to 3.0% by mol, for example of 1.0 to 2.0% by mol. The sum of the portions of $Rb_2O$ and $Cs_2O$ may, for example, be at least 0.5% by mol or at least 1% by mol. The sum of the portions of $Rb_2O$ and $Cs_2O$ may, for example, be at most 3.0% by mol or at most 2.0% by mol.

Exemplary Glass Compositions

In the context of the previously mentioned base system, the exemplary embodiments result from the provision of a desired combination of high refractive index and low density. This can be achieved by a suitable combination of the portions of the individual phases.

An exemplary composition is characterized by the following constituent phases of the glass:

Production

TABLE 5

| Constituent phase | Min. (% by mol) | Max. (% by mol) |
|---|---|---|
| lanthanum titanate | 20 | 60 |
| lanthanum niobate | 20 | 40 |
| lanthanum molybdenum borate | 0 | 20 |
| lanthanum borate | 4 | 20 |
| yttrium borate | 4 | 20 |
| gadolinium borate | 0 | 20 |
| zirconium silicate | 4 | 20 |
| diboron trioxide | 4 | 20 |
| silicon dioxide | 0 | 10 |

According to the present invention is also a method for the production of a glass provided according to the invention, with the steps:

melting of the glass raw materials, optionally forming of a glass article, in particularly an ingot or a flat glass, from the glass melt cooling of the glass.

The forming of the glass may comprise a drawing process. The cooling may be an active cooling using a heat dissipating device or may be conducted by passively allowing to cool down.

For suppressing undesired redox reactions, for example, sulphatic raw materials can be used, it can be refined with sulfate and/or the melt can be bubbled with oxygen.

Uses and Glass Articles

In addition to the glass, according to the present invention are also glass articles formed from the glass such as thin glasses having thicknesses of ≤0.5 mm, for example ≤0.3 mm and/or a width of at least 150 mm, for example at least 200 mm or at least 300 mm. The thickness may be, for example, at least 25 µm or at least 50 µm.

The invention also relates to the use of the glasses provided according to the present invention, in particularly as optical glasses, as lenses in objectives, in AR eyeglasses, as wafers, in the field wafer level optics, as lenses, for example spherical lenses, in optical wafer applications, as light wave guides and/or in the classical optics.

Examples

Some embodiment examples can be found in the following tables.

TABLE 6

| Constituent phase | 1 % by mol | 2 % by mol | 3 % by mol | 4 % by mol | 5 % by mol | 6 % by mol |
|---|---|---|---|---|---|---|
| lanthanum titanate | 44 | 60 | 44 | 44 | 44 | 44 |
| lanthanum niobate | 30 | 20 | 20 | 20 | 20 | 20 |
| lanthanum molybdenum borate | 0 | 0 | 12 | 12 | 8 | 4 |
| lanthanum borate | 4 | 4 | 4 | 4 | 4 | 4 |
| yttrium borate | 4 | 4 | 4 | 4 | 4 | 4 |
| gadolinium borate | 4 | 4 | 4 | 4 | 4 | 4 |
| zirconium silicate | 4 | 4 | 4 | 4 | 8 | 12 |
| diboron trioxide | 6 | 4 | 8 | 4 | 4 | 4 |
| silicon dioxide | 4 | 0 | 0 | 4 | 4 | 4 |
| calculated density | 5.09 | 5.12 | 4.93 | 4.99 | 4.97 | 4.95 |
| calculated BZ | 2.14 | 2.20 | 2.10 | 2.11 | 2.11 | 2.11 |

TABLE 7

| Constituent phase | 7 % by mol | 8 % by mol | 9 % by mol | 10 % by mol | 11 % by mol | 12 % by mol |
|---|---|---|---|---|---|---|
| lanthanum titanate | 39 | 36 | 38 | 38 | 32 | 32 |
| lanthanum niobate | 27 | 24 | 26 | 26 | 36 | 36 |
| lanthanum molybdenum borate | 0 | 0 | 0 | 0 | 0 | 0 |
| lanthanum borate | 20 | 16 | 2 | 12 | 6 | 6 |
| yttrium borate | 5 | 4 | 2 | 2 | 2 | 2 |
| gadolinium borate | 0 | 0 | 8 | 8 | 8 | 8 |
| zirconium silicate | 4 | 16 | 16 | 6 | 6 | 6 |
| diboron trioxide | 5 | 4 | 6 | 6 | 6 | 8 |
| silicon dioxide | 0 | 0 | 2 | 2 | 4 | 2 |
| calculated density | 5.18 | 5.09 | 5.04 | 5.14 | 5.20 | 5.17 |
| calculated BZ | 2.12 | 2.11 | 2.11 | 2.10 | 2.11 | 2.11 |

TABLE 8

| Constituent phase | 13 % by mol | 14 % by mol | 15 % by mol | 16 % by mol | 17 % by mol | 18 % by mol |
|---|---|---|---|---|---|---|
| lanthanum titanate | 40 | 36 | 30 | 28 | 26 | 26 |
| lanthanum niobate | 30 | 30 | 30 | 34 | 36 | 36 |
| lanthanum molybdenum borate | 0 | 0 | 0 | 0 | 0 | 0 |
| lanthanum borate | 6 | 6 | 16 | 10 | 2 | 2 |
| yttrium borate | 2 | 6 | 16 | 18 | 28 | 30 |
| gadolinium borate | 6 | 12 | 2 | 2 | 2 | 0 |
| zirconium silicate | 2 | 2 | 2 | 2 | 2 | 2 |
| diboron trioxide | 6 | 4 | 2 | 2 | 2 | 2 |
| silicon dioxide | 8 | 4 | 2 | 4 | 2 | 2 |
| calculated density | 5.05 | 5.24 | 5.23 | 5.21 | 5.20 | 5.17 |
| calculated BZ | 2.11 | 2.11 | 2.10 | 2.10 | 2.10 | 2.10 |

TABLE 9

| Constituent phase | 19 % by mol | 20 % by mol | 21 % by mol | 22 % by mol | 23 % by mol | 24 % by mol |
|---|---|---|---|---|---|---|
| lanthanum titanate | 70 | 60 | 50 | 76 | 66 | 56 |
| lanthanum niobate | 10 | 20 | 30 | 10 | 20 | 30 |
| lanthanum molybdenum borate | 0 | 0 | 0 | 0 | 0 | 0 |
| lanthanum borate | 2 | 2 | 2 | 2 | 2 | 2 |
| yttrium borate | 2 | 2 | 2 | 2 | 2 | 2 |

TABLE 9-continued

| Constituent phase | 19 % by mol | 20 % by mol | 21 % by mol | 22 % by mol | 23 % by mol | 24 % by mol |
|---|---|---|---|---|---|---|
| gadolinium borate | 0 | 0 | 0 | 0 | 0 | 0 |
| zirconium silicate | 2 | 2 | 2 | 2 | 2 | 2 |
| diboron trioxide | 12 | 12 | 12 | 6 | 6 | 6 |
| silicon dioxide | 0 | 0 | 0 | 0 | 0 | 0 |
| calculated density | 4.61 | 4.79 | 4.94 | 4.86 | 5.02 | 5.16 |
| calculated BZ | 2.17 | 2.16 | 2.16 | 2.25 | 2.23 | 2.22 |

TABLE 10

| Constituent phase | 25 % by mol | 26 % by mol | 27 % by mol | 28 % by mol | 29 % by mol | 30 % by mol |
|---|---|---|---|---|---|---|
| lanthanum titanate | 66 | 56 | 46 | 50 | 60 | 70 |
| lanthanum niobate | 12 | 22 | 32 | 32 | 22 | 12 |
| lanthanum molybdenum borate | 0 | 0 | 0 | 0 | 0 | 0 |
| lanthanum borate | 4 | 4 | 4 | 4 | 4 | 4 |
| yttrium borate | 4 | 4 | 4 | 4 | 4 | 4 |
| gadolinium borate | 0 | 0 | 0 | 0 | 0 | 0 |
| zirconium silicate | 4 | 4 | 4 | 4 | 4 | 4 |
| diboron trioxide | 6 | 6 | 6 | 4 | 4 | 4 |
| silicon dioxide | 4 | 4 | 4 | 2 | 2 | 2 |
| calculated density | 4.78 | 4.94 | 5.07 | 5.19 | 5.06 | 4.91 |
| calculated BZ | 2.17 | 2.17 | 2.16 | 2.20 | 2.21 | 2.22 |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass, comprising a composition which is characterized by the following constituent phases of the glass:

| Constituent phase | Min. (% by mol) | Max. (% by mol) |
|---|---|---|
| lanthanum titanate | 20 | 80 |
| lanthanum niobate | 10 | 50 |
| lanthanum molybdenum borate | 0 | 60 |
| lanthanum borate | 2 | 40 |
| yttrium borate | 2 | 40 |
| gadolinium borate | 0 | 40 |
| zirconium silicate | 2 | 40 |
| diboron trioxide | 2 | 40 |
| silicon dioxide | 0 | 20; | wherein a refractive index $n_D$ calculated according to the following formula $$n_D = \sqrt{\frac{4\pi\alpha}{\left(2.26 - \frac{4\pi}{3}\right)\alpha + V_m} + 1}$$

is at least 2.05, wherein $\alpha$ is a polarizability of a molecular unit of the glass and $V_m$ is a molecular volume.

2. The glass of claim 1, wherein the composition is characterized by the following constituent phases of the glass:

| Constituent phase | Min. (% by mol) | Max. (% by mol) |
|---|---|---|
| lanthanum titanate | 20 | 60 |
| lanthanum niobate | 20 | 40 |
| lanthanum molybdenum borate | 0 | 20 |
| lanthanum borate | 4 | 20 |
| yttrium borate | 4 | 20 |
| gadolinium borate | 0 | 20 |
| zirconium silicate | 4 | 20 |
| diboron trioxide | 4 | 20 |
| silicon dioxide | 0 | 10. |

3. The glass of claim 1, wherein a ratio of the portion of lanthanum titanate to the portion of lanthanum niobate is at least 0.7:1.

4. The glass of claim 1, wherein a sum of the portions of the constituent phases diboron trioxide and silicon dioxide is in a range of 4 to 20% by mol.

5. The glass of claim 1, wherein a density $\rho$ of the glass calculated according to the following formula $$\rho = \frac{\sum_{i=1}^{n} c_i \cdot M_i}{\sum_{i=1}^{n} c_i \cdot \frac{M_i}{\rho_i}}$$

is less than 5.30 g/cm$^3$, wherein $M_i$ is a molar mass of each constituent phase, $\rho_i$ is a density of each constituent phase, and $c_i$ is a molar proportion of each constituent phase.

6. The glass of claim 1, wherein a sum of the portions of lanthanum titanate and lanthanum niobate is at least 50% by mol.

7. The glass of claim 1, wherein a quotient of a density of the glass calculated according to the following formula $$\rho = \frac{\sum_{i=1}^{n} c_i \cdot M_i}{\sum_{i=1}^{n} c_i \cdot \frac{M_i}{\rho_i}}$$

and the refractive index $n_D$ is at most 2.50 g/cm³, wherein $M_i$ is a molar mass of each constituent phase, $\rho_i$ is a density of each constituent phase, and $c_i$ is a molar proportion of each constituent phase.

8. The glass of claim 1, wherein a ratio of the portion of the constituent phases silicon dioxide to diboron trioxide is in a range of 0 to <1.

9. The glass of claim 1, wherein the glass contains further constituents as balance and wherein a portion of the balance is at most 3% by mol.

10. A glass article comprising the glass of claim 1 and having a thickness of at most 0.5 mm.

11. The glass article of claim 10, wherein the glass article comprises at least one of a lens, augmented reality (AR) eyeglasses, a wafer, or a light wave guide.

12. A glass, comprising a composition which is characterized by the following constituent phases of the glass:

| Constituent phase | Min. (% by mol) | Max. (% by mol) |
|---|---|---|
| lanthanum titanate | 20 | 80 |
| lanthanum niobate | 10 | 50 |
| lanthanum molybdenum borate | 0 | 60 |
| lanthanum borate | 2 | 40 |
| yttrium borate | 2 | 40 |
| gadolinium borate | 0 | 40 |
| zirconium silicate | 2 | 40 |
| diboron trioxide | 2 | 40 |
| silicon dioxide | 0 | 20; | wherein a quotient of a density $\rho$ calculated according to the following formula (1)

$$\rho = \frac{\sum_{i=1}^{n} c_i \cdot M_i}{\sum_{i=1}^{n} c_i \cdot \frac{M_i}{\rho_i}}$$

and a refractive index $n_D$ calculated according to the following formula (4)

$$n_D = \sqrt{\frac{4\pi\alpha}{\left(2.26 - \frac{4\pi}{3}\right)\alpha + V_m} + 1}$$

is at most 2.50 g/cm³, wherein $M_i$ is a molar mass of each constituent phase, $\rho_i$ is a density of each constituent phase, $c_i$ is a molar proportion of each constituent phase, $\alpha$ is a polarizability of a molecular unit of the glass, and $V_m$ is a molecular volume, wherein the refractive index $n_D$ is at least 2.05.

13. The glass of claim 12, wherein the density of the glass calculated according to the formula (1) is less than 5.30 g/cm³.

14. A glass, comprising a composition which is characterized by the following constituent phases of the glass:

| Constituent phase | Min. (% by mol) | Max. (% by mol) |
|---|---|---|
| lanthanum titanate | 20 | 60 |
| lanthanum niobate | 20 | 40 |
| lanthanum molybdenum borate | 0 | 20 |
| lanthanum borate | 4 | 20 |
| yttrium borate | 4 | 20 |
| gadolinium borate | 0 | 20 |
| zirconium silicate | 4 | 20 |
| diboron trioxide | 4 | 20 |
| silicon dioxide | 0 | 10. |

15. The glass of claim 14, wherein a ratio of the portion of lanthanum titanate to the portion of lanthanum niobate is at least 0.7:1.

16. The glass of claim 14, wherein a sum of the portions of the constituent phases diboron trioxide and silicon dioxide is in a range of 4 to 20% by mol.

17. The glass of claim 14, wherein a sum of the portions of lanthanum titanate and lanthanum niobate is at least 50% by mol.

18. The glass of claim 14, wherein a ratio of the portion of the constituent phases silicon dioxide to diboron trioxide is in a range of 0 to <1.

* * * * *